May 6, 1969 V. C. MARTIN 3,443,186
REVERSING MOTOR DRIVE FOR TYPE BAR
Filed March 28, 1966 Sheet 1 of 10

INVENTOR
VAN C. MARTIN
BY Francis V. Giolma
ATTORNEY

United States Patent Office 3,443,186
Patented May 6, 1969

3,443,186
REVERSING MOTOR DRIVE FOR TYPE BAR
Van C. Martin, Boulder, Colo., assignor to International Business Machines Corporation, Armonk, N.Y., a corporation of New York
Filed Mar. 28, 1966, Ser. No. 537,912
Int. Cl. H02p 1/22, 1/40, 3/20
U.S. Cl. 318—257                                7 Claims This invention relates generally to control system and has reference in particular to a reversible drive control system for a motor driving a type bar in a bar printer.

The bar printer is an on-the-fly front printer in which print hammers drive flexible type fingers, which are mounted on a horizontally moving type bar, to impact the ribbon, paper, and platen. The type bar moves in both directions, and at each end of its travel the type bar is stopped to await the next print command, at which time it is started up in the reverse direction to print the next line.

The type bar is driven by a motor through a pinion and a rack on one end of the bar. The drive must accelerate the bar rapidly to print velocity and maintain this velocity during printing. At the end of the line it must rapidly stop the bar. Upon receipt of the next start command it must accelerate the bar to print velocity in the reverse print direction for the next line. The requirements of a drive for such an application are:

(1) It must be reversible;
(2) It must have sufficient torque to accelerate and decelerate the type bar in a relative short time and displacement;
(3) It must maintain a relatively constant velocity during printing over a wide range of friction loadings and dynamic loadings due to the firing of print hammers; and
(4) It must be reliable and trouble free.

Generally stated, it is an object of this invention to provide for selectively controlling accelerate and decelerate triggers which gate the drive for a type bar motor in response to clock and feedback signals, and for resetting the clock each time a feedback signal occurs, after the lapse of a predetermined start time.

More specifically, it is an object of this invention to initiate velocity sensing of a print bar drive motor during acceleration, after the end of a predetermind start time period, reset a clock provided for controlling drive of the motor each time a feedback pulse occurs during acceleration, and count the elapsed time until the next feedback pulse.

Another object of this invention is to provide in a velocity sensing control for a print bar drive motor, for shutting down the drive circuit in the event that more than a predetermined number of feedback signals occur without receiving a clock pulse.

It is also an object of this invention to provide for shutting down the drive circuit in the event that no feedback pulse is received within a predetermined count of clock pulses while not starting or stopping.

Yet another object of this invention is to provide in an overshoot control for a printed circuit motor driving a type bar, for using a counter to produce clock pulses, controlling accelerate and decelerate drivers by means of clock and feedback pulses from the motor to control operation of the motor, and for resetting both the accelerate and decelerate triggers when a feedback pulse occurs before a particular count is reached by the counter.

It is a further object of this invention to provide for using a binary counter for not only providing clock pulses to control the operation of a printed circuit type bar motor, but for also determining the duration of a predetermined start period.

Still another object of this invention is to provide for using clock and feedback pulses to control opposing drive circuits for a motor driving a type bar, and for deriving a voltage level from an activated one of such circuits for preventing activation of the other one of the drive circuits.

It is also another object of this invention to provide for using a resettable counter driven by a crystal oscillator for producing clock pulses to control operation of a direct current motor, and for resetting the counter during starting to a count other than zero should a feedback pulse be detected while the counter is in a predetermined counting range.

It is also another object of this invention to provide for using a bistable device to remember whether the accelerate or decelerate trigger in the control operated or was turned on last, and for providing a predetermined timed pulse in a corrective direction for controlling operation of the motor should a second successive energization of either trigger occur.

According to a preferred embodiment of the invention a printed circuit motor is reversibly energized to drive a type bar first in one direction and then in the reverse direction in response to successive print commands. A crystal oscillator driving a multistable binary counter provides clock pulses for controlling the speed of the motor. Feedback pulses are provided by a magnetic emitter disc driven by the motor, and are used in conjunction with the clock pulses to control accelerate and decelerate triggers for applying forward and reverse torque, respectively, for bringing the motor up to speed, maintaining its speed and then stopping the motor at the end of a print line. During acceleration the clock is reset to zero, after a predetermined start interval by each feedback pulse, while the motor is still not up to speed, and after the motor is up to speed, reset of the clock counter is to a 1 rather than zero, so as to force the clock into the proper phase relationship, after which the counter runs free to the end of the print line.

The foregoing and other objects, features and advantages of the invention will be apparent from the following more particular description of preferred embodiments of the invention, as illustrated in the accompanying drawings.

Figure 1:
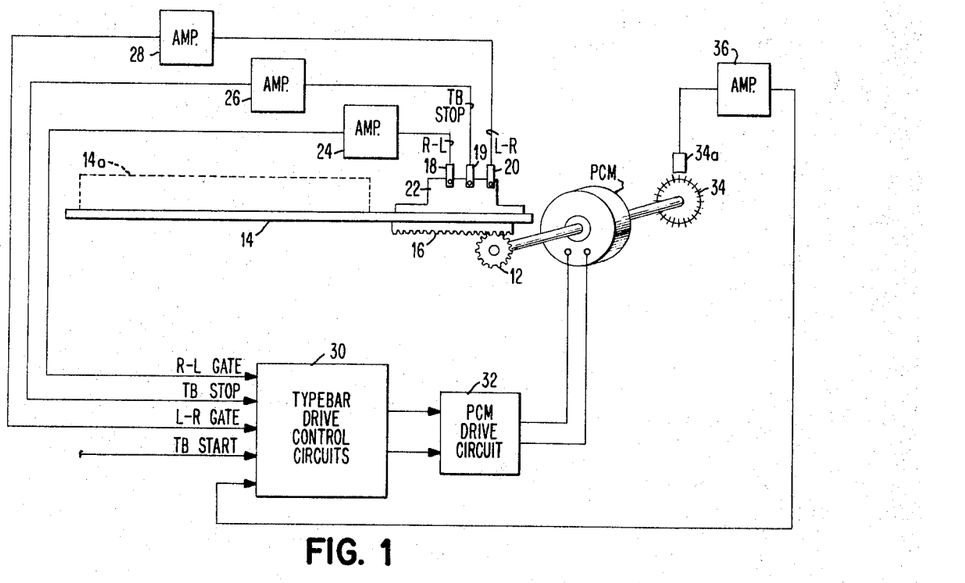
FIGURE 1 is a simplified schematic representation of a type bar mechanism and motor controls.

Referring particularly to FIGURE 1 of the drawings, a printed circuit motor PCM is shown connected by means of a pinion 12 to drive a type bar 14 having a plurality of flexible type bearing fingers 14a, through a rack 16 secured to the right end of the type bar. Solar cells 18, 19 and 20 with their associated light sources are arranged in conjunction with a flag 22 secured to the type bar for providing Right-Left, TB Stop and Left-Right signals, respectively, through their associated amplifiers 24, 26 and 28 to a block 30 containing the printed circuit motor control circuit for aplication to drive circuits 32 controlling operation of the motor PCM. Feedback pulses having a frequency proportional to the speed of the motor are provided by means of a magnetic feedback disc 34 driven by the motor and an associated pickup 34a through amplifier 36 to the control circuits 30. A type bar signal TB Start is provided from the printer controls for initiating operations of the motor, as will be explained hereinafter.

Figure 2:
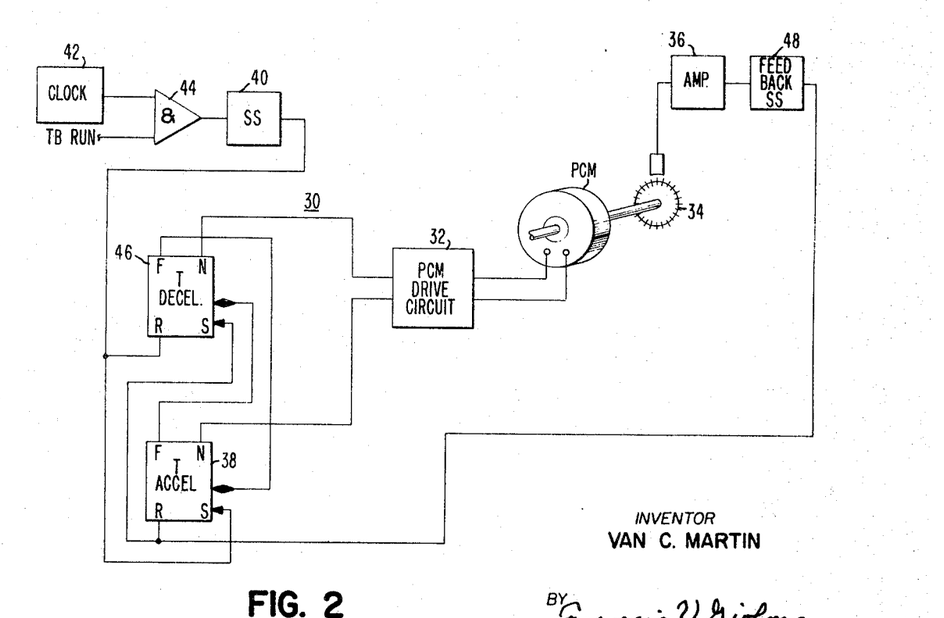
FIGURE 2 is a simplified schematic diagram showing the basic elements of a type bar motor control according to the prior art.

Referring to FIGURE 2 it will be seen that in a prior art simlified form of the control circuit 30, an Accelerate trigger 38 is provided which is set by clock pulses from a clock single shot 40 which is controlled by a clock 42 through an AND circuit 44 in conjunction with a TB Run signal. The trigger 38 is turned on by a set pulse from the single shot 40, which is gated by the off output of a Decelerate trigger 46, as represented by the diamond-shaped marker. The set input will set the trigger only if the gate input is turned on prior to the rise of the set signal. Pulses from the feedback disc 34 are applied through amplifier 36 and a feedback single shot 48 to reset the Accelerate trigger 38 and set the Decelerate trigger, when gated by the off output of the Accelerate trigger.

In this simplified control the Accelerate trigger 38 is set on by the clock single shot 40 and turned off by the feedback single shot 48, with its on duration proportional to the phase lag of the feedback signal with respect to the clock signal. Once a steady state condition is achieved, the drive stays on only long enough to make up losses due to friction, etc. However, because this is a displacement feedback, velocity can overshoot as shown in FIGURE 3, and continue to oscillate.

Figure 3:
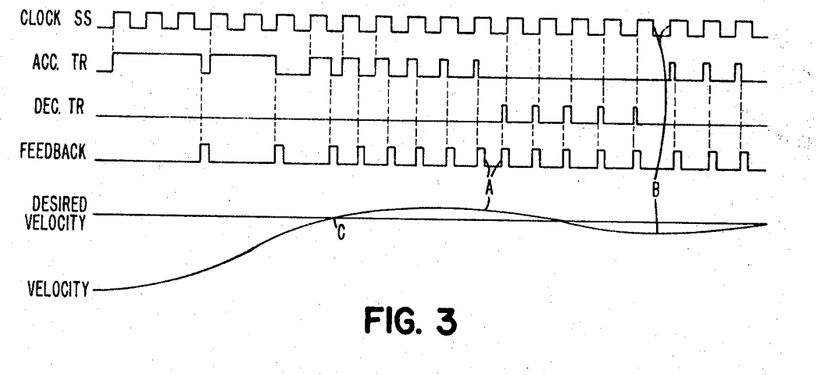
FIGURE 3 illustrates typical timing curves for the simplified control circuit of FIGURE 2.

When the velocity overshoots, feedback frequency exceeds clock frequency until two feedback pulses occur between consecutive clock pulses, the first resetting the Accelerate trigger 38, and the second setting the Decelerate trigger 46 as shown at the point (A) in FIGURE 3. Because the feedback signal now leads the clock signal in phase, the Decelerate trigger 46 then continues to come on with successive feedback pulses, being turned off by each clock pulse, until the velocity undershoots sufficiently to bring the feedback and clock signals into phase again and two clock pulses occur between the consecutive feedback pulses. The Accelerate trigger 38 is then set on by the second clock pulse as shown at the point (B) in FIGURE 3. These velocity excursions continue to occur unless further refinements are employed. Such excursions are similar to phase angle variations in a synchronous A-C motor, and are known as hunting.

Figure 4A:
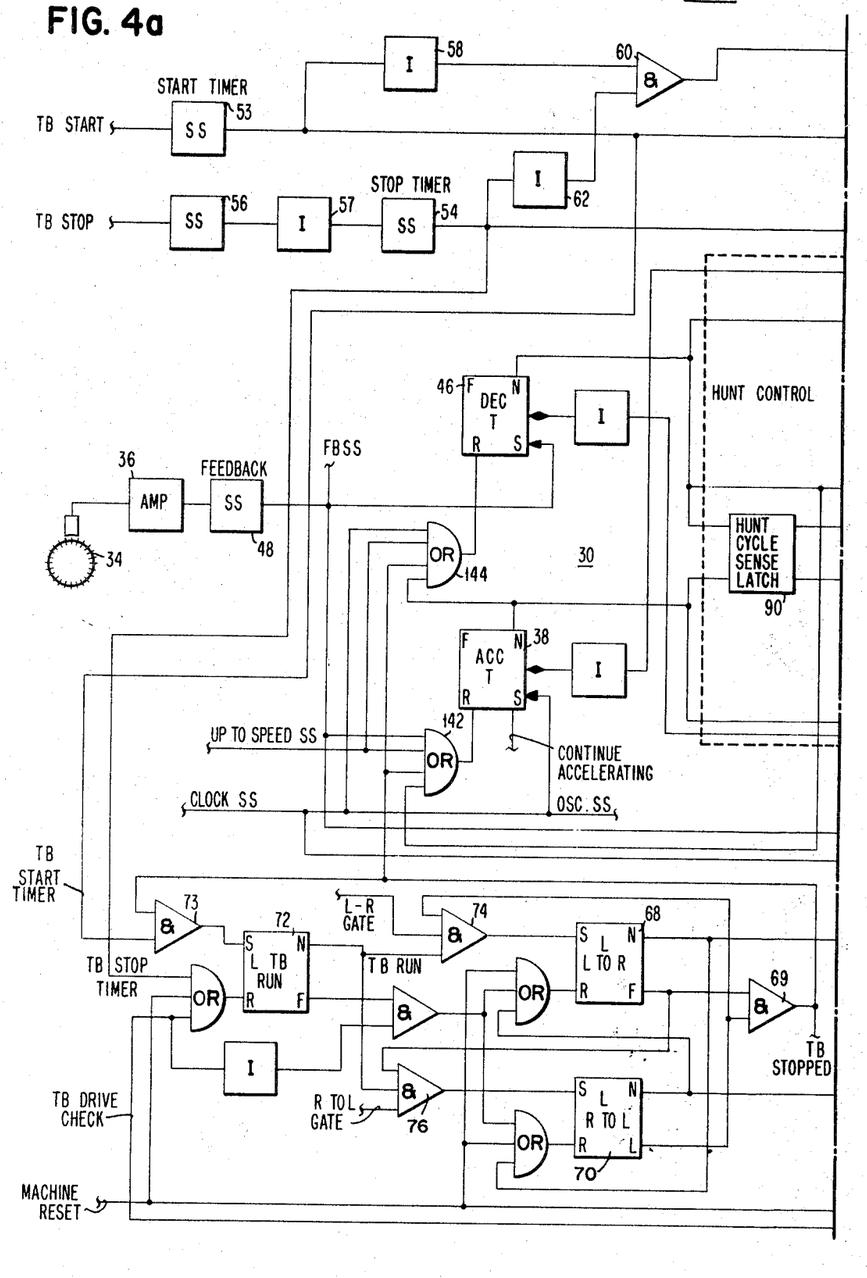
FIGURES 4a, 4b taken together provide a schematic circuit diagram of the type bar drive controls according to the present invention.
Figure 4B:
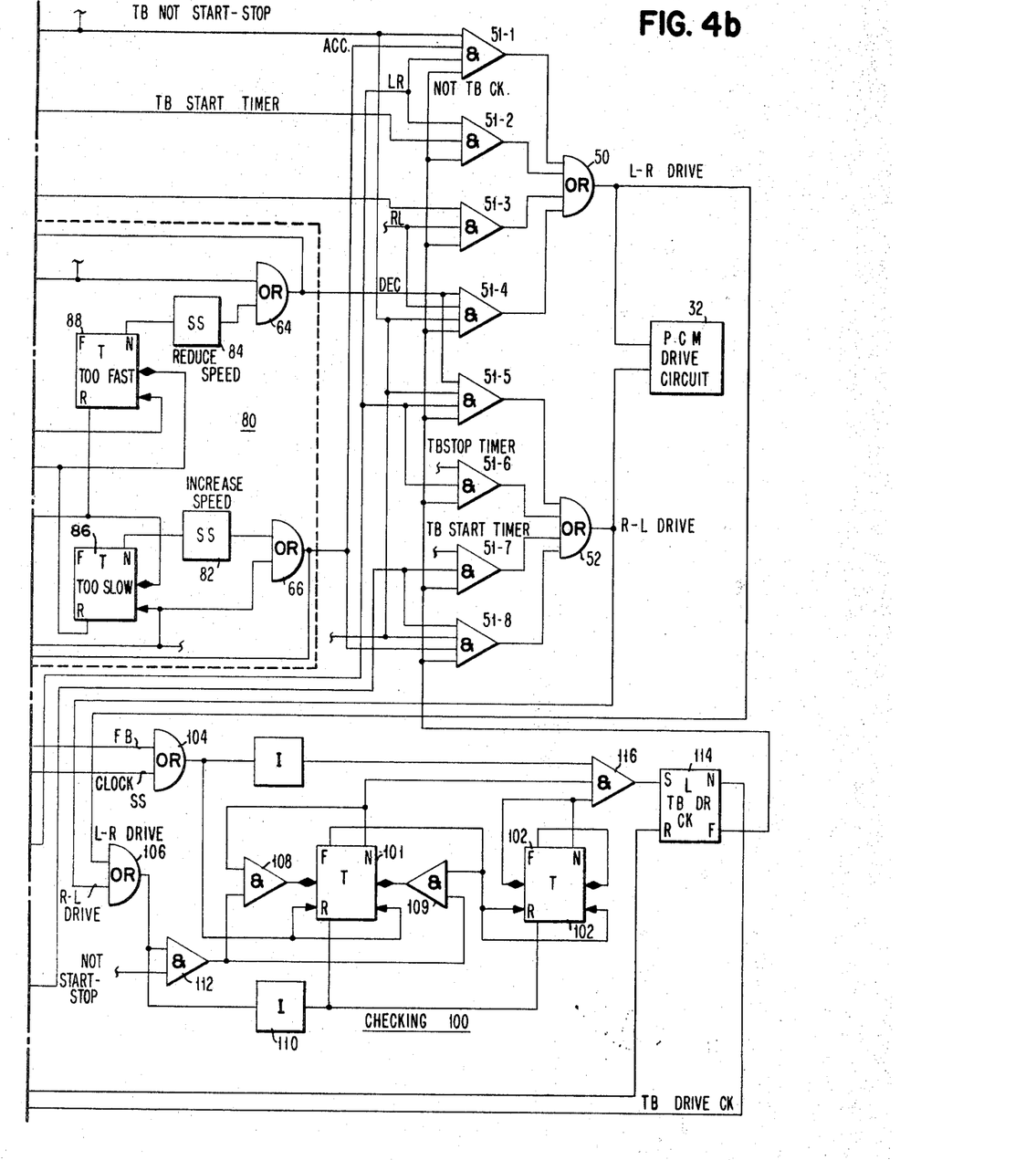

Referring to FIGURES 4a and 4b it will be seen that according to the present invention the Accelerate and Decelerate triggers 38 and 46 of control circuit 30 basically provide the control to the printed circuit motor drive circuit 32 by L-R and R-L Drive signals through a pair of OR circuits 50 and 52, whose inputs are supplied by a plurality of AND circuits 51-1 through 51-8. Inputs to these AND circuits are provided primarily from a Start Timer single shot 53 having a duration on the order of 14 milliseconds in response to the TB Start signal from the printer controls (not shown), and from a Stop Timer single shot 54 having a duration on the order of 16 milliseconds through a Stop Delay single shot 56 having a duration on the order of 10 milliseconds and inverter 57. The output of the Start Timer 53 is supplied through an inverter 58 and gated in AND circuit 60 with the inverted output of the Stop Timer 54 through inverter 62 to provide a TB Not Start-Stop signal. The direct output of the Start Timer 53 provides TB Start Timer signal. The output of Stop Timer single shot 54 provides a TB Stop Timer signal. A Decelerate signal is provided to the AND circuits 51-4 and 51-5 from the on output of the Decelerate trigger 46 through OR circuit 64 while an Accelerate signal is provided to AND circuits 51-5 and 51-8 through OR circuit 66 from the on output of the Accelerate trigger 38. A Left-to-Right signal (L-R) is provided to AND circuits 51-1, 51-2, 51-5 and 51-6 from a L-R latch 68, while a Right-to-Left signal (R-L) is provided to AND circuits 51-3, 51-4, and 51-7, 51-8 by a R-L latch 70. The latch 68 is turned on by the on output of a Type Bar Run latch 72 through AND circuit 74 in conjunction with L-R gate signal from solar cell 20, while a latch 70 is turned on through a corresponding AND circuit 76 by TB Run in conjunction with a R-L gate signal from solar cell 18. AND circuit 69 provides a TB Stopped signal from the off outputs of latches 68 and 70.

Figure 11:
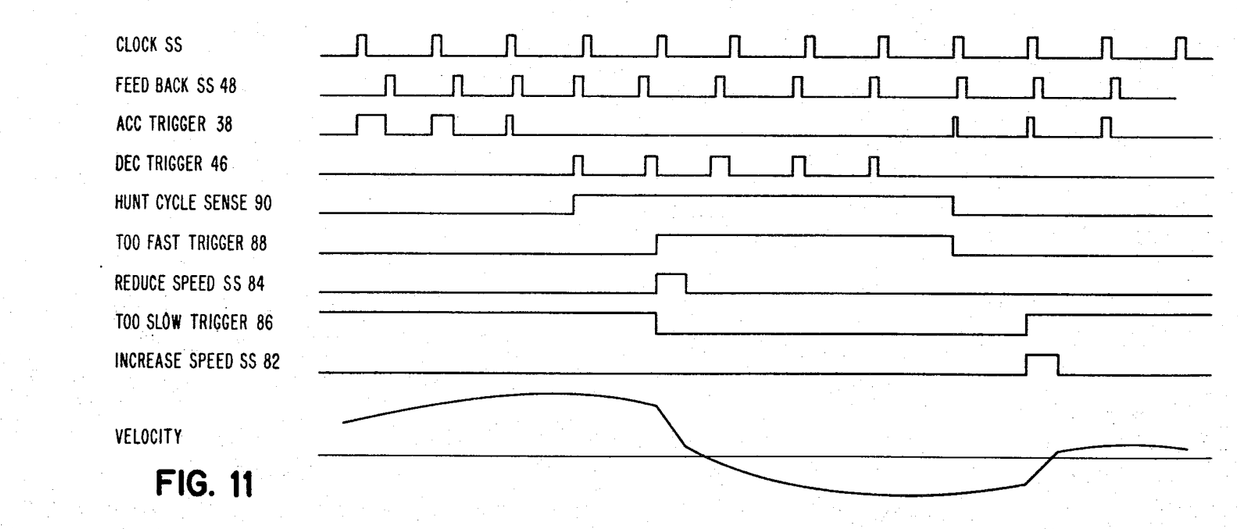
FIGURE 11 is a timing diagram illustrating the operation of the antihunt portion of the control circuits of FIGURES 4a, 4b and 7a, 7b.

A hunt control circuit 80 utilizing an Increase Speed single shot 82 and a Reduce Speed single shot 84 for supplying predetermined duration signals through OR circuits 64 and 66 to the PCM drive circuit 32 through AND circuits 51-1 through 51-8, is utilized in accordance with the present invention to minimize the amplitude of velocity excursions as the drive switches between accelerate and decelerate modes. The single shot 82 having a duration on the order of 350 microseconds is turned on by a Too-Slow trigger 86, while the single shot 84 having a duration on the order of 200 microseconds is turned on by a Too-Fast trigger 88. These triggers are controlled by a Hunt Cycle Sense latch 90, which is set and reset by the on outputs of the Decelerate and Accelerate triggers 46 and 38, respectively. The latch 90 provides gate signals to the latches 86 and 88, the set signals therefor coming from the on outputs of the Accelerate and Decelerate triggers themselves. FIG. 11 shows timing curves illustrating the operating mode of the hunt control.

In order to check against type bar jam, feedback or amplifier failure, clock failure, or failure of either the Accelerate or Decelerate triggers to reset, a checking circuit 100 is provided in this embodiment of the present invention. This circuit comprises a two-stage binary counter of triggers 101 and 102, which counts clock pulses and feedback pulses from OR circuit 104, with reset of the triggers being provided through inverter 110 from an OR circuit 106 having as inputs L-R Drive signal and R-L Drive signal. OR 106 also supplies gate signals to trigger 101 through AND circuits 108 and 108 through AND circuit 112 in conjunction with the Not Start-Stop signal. Accordingly, when both the L-R and R-L drives are off (which should be once every clock cycle when not starting or stopping) the counter is reset. If the counter ever reaches a count of 3, a Type Bar Check latch 114 is set through AND circuit 116, and the output is used to reset the Type Bar Run latch 72 to remove drive from the motor.

Figure 5:
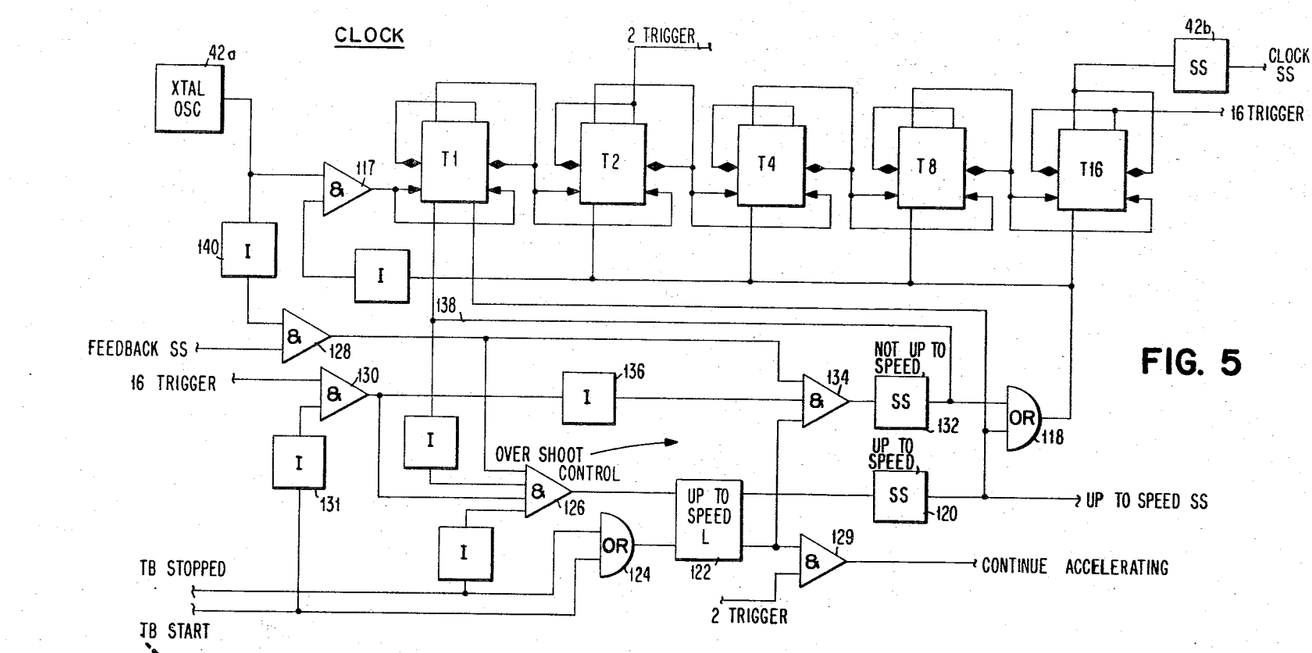
FIGURE 5 is a schematic circuit diagram of the clock and overshoot inhibit control of the present invention used with the circuit of FIGURES 4a, 4b.
Figure 5A:
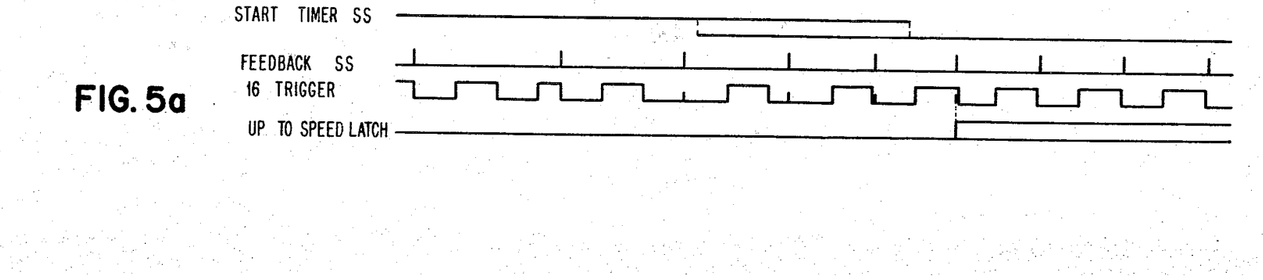
FIGURE 5a shows typical timing curves for the circuits of FIGURE 5.

Referring to FIGURE 5 it will be seen that according to the present invention, a clock single shot 42b producing clock pulses is driven by a five-stage multistable binary counter utilizing bistable trigger devices T1, T2, T4, T8 and T16. The counter is driven by a crystal oscillator 42a through AND circuit 117. Reset of the counter to zero is effected through OR circuit 118 which resets triggers T2, T4, T8 and T16 in response to an output from a Not Up-to-Speed single shot 132, or an Up-to- Speed single shot 120 which calls for the clock to be reset to a 1 rather than to a zero, the output of a single shot 120 being applied to set the trigger T1. The Up-to-Speed single shot 120 is activated by the on output of an Up-to-Speed latch 122, which during the TB Start timer period is held reset through OR circuit 124, and is set when the type bar comes up to speed, through AND circuit 126. Feedback pulses are applied thereto from AND circuit 128 while the 16-stage of the counter is on and TB Start timer is off, as evidenced by the output of the AND circuit 130 having an input connected to the output of the trigger T16, and another connected through inverter 131 to the TB Start timer. AND circuit 129 is used to provide a Continue Accelerating signal for resetting the Accelerate trigger 38 by combining the off output of the Up-to-Speed latch 122 with the output of counter trigger T2.

During acceleration and before the motor reaches speed, the clock triggers are reset through OR circuit 118 from a Not Up-to-Speed single shot 132 which is turned on by AND circuit 134 in response to the inverted output of the trigger 16 through inverter 136, a feedback pulse from AND 128, and the off output of the Not Up-to-Speed latch 122. The output of the single shot 132 not only resets the triggers T2, T4, T8 and T16 through OR circuit 118 but also resets T1 over conductor 138 so as to reset the counter to zero.

In operation, Accelerate trigger 38 is turned on by pulses from clock single shot 42b and turned off by pulses from feedback single shot 48, but during starting, PCM drive circuit 32 is energized through AND 51–2 in response to TB Start timer L-R and Not TB Check. The Start Timer single shot 52 provides continuous acceleration drive for 14 milliseconds, or until the motor is approximately up to ¾ speed. Start Timer single shot 53 is fired by the TB Start signal from the printer controls through AND 73 and in turn sets the TB Run latch 72 and either the Left-to-Right or the Right-to-Left latch 68 or 70, depending upon the type bar position as evidenced by the L-R gate or R-L gate signals from solar cells 20 and 18 through AND circuits 74 and 76, respectively. When the motor is up to speed, the Accelerate and Decelerate triggers 38 and 46 take over as previously described, and acceleration is continued for example, through AND 51–1 in response to Accelerate (from OR 66), L-R, Not TB Start-Stop, and Not TB Check. When the TB Stop solar cell 19 is sensed, the Stop Delay single shot 56 fires, providing sufficient type bar displacement before stopping so that when the type bar starts up in the reverse direction it will be up-to-speed before reaching the first position. At the end of the Stop Delay signal, the Stop Timer single shot 54 provides deceleration drive through AND 51–6 and OR 52, or AND 51–3 and OR 50 of such duration as to bring the type bar to a stop, the direction of the voltage applied to the motor being a function of the type bar direction.

As shown in FIGURE 5, high frequency output of crystal oscillator 42a is stepped down through a five-stage binary counter whose last step is of the frequency desired. The five-stage counter permits the clock output phase to be shifted to within 1/32 of a cycle of any phase by resetting the counter to the proper count. Velocity sensing during acceleration, but after the termination of Start Timer signal, is achieved by resetting the clock through the Not Up-to-Speed single shot 132 each time a feedback pulse occurs, and counting the elapsed time before the next feedback pulse. The Start Timer single shot 52 is set to turn off after the velocity has reached approximately ¾ of ideal velocity. During the Start Timer signal, velocity sensing is ineffective because the Up-to-Speed latch 122 is held reset by TB Start signal through OR 124. Thereafter should a feedback pulse occur before the count of 32, as determined by the 16-stage of the counter being on (the counter having been reset to zero by the previous reset pulse), and the oscillator output is down as evidenced by the inverted signal from inverter 140, the Up-to-Speed latch 122 is set, firing the Up-to-Speed single shot 120. The counter is thereupon reset to 1 to establish the proper phase relationship, and both the Accelerate and Decelerate triggers 38 and 46 are reset through OR circuits 142 and 144 respectively. The clock then runs free through the end of the line and overshoots are controlled to a permissible value.

Any tendency of the system to oscillate or hunt is minimized according to the present invention, by the Hunt Control circuit 80, wherein the Hunt Cycle Sense latch 90 senses the transition between acceleration and deceleration mode. At this time a proper duration drive pulse from either the Increase Speed single shot 82 or the Reduce Speed single shot 84 is applied to the motor through OR 66 or OR 64 so that the velocity can be corrected to maintain a minimum placement error. The Too-Fast and Too-Slow triggers 86 and 88 switch only after two successive deceleration or acceleration operations, respectively, thus reducing disturbances caused by erroneous feedback. The Too-Fast trigger 88 fires the Reduced Speed single shot 84, and the Too-Slow trigger 86 fires the Increase Speed single shot 82. Outputs from these single shots are applied to the drive circuit 32 through OR circuits 64 and 66 and AND circuits 51–1 and 51–8, 51–4 and 51–5, respectively, as shown by the timing curves of FIGURE 11.

When hunting occurs, a maximum velocity error is present at the time there is zero displacement error. The hunt control single shots fire only upon the transition from accelerate mode to decelerate mode or vice versa (the transition indicating zero displacement error) and compensate for the velocity error which exists at that time. The single shots may be though of as providing coarse correction at the point of transition, with the normal feedback pulses which are of much shorter duration providing the fine correction.

Figure 6:
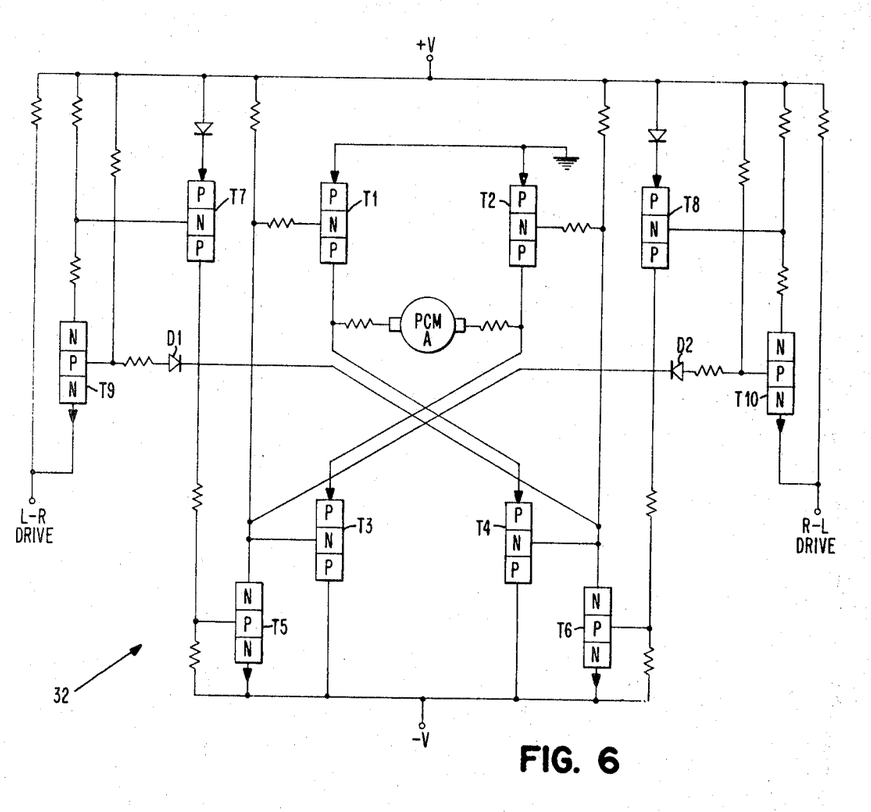
FIGURE 6 is a circuit diagram of the printed circuit motor drive circuit for FIGURE 4b.

Referring to FIGURE 6 it will be seen that the printed circuit motor drive circuit 32 may comprise a bridge circuit of power transistors T1, T2, T3, T4, connected to effect energization in the armature PCMA of the motor in opposite directions in response to L–R and R–L drive signals. The L–R drive signal is used to control transistors T1 and T3, transistor T9 being connected to turn on in response to a negative-going L-R drive signal and driving the base of transistor T7 sufficiently negative to turn it on, which causes the base of transistor T5 to become positive. Transistor T5 turning on renders the base drive of the transistors T1 and T3 sufficiently negative to turn them on and effect L–R operation of the motor. Transistor T10, through transistors T8 and T6, likewise controls the base drive of the transistors T2 and T4 for effecting energization of the printed circuit motor armature in response to a R–L drive signal. Diodes D1 and D2 connect the bases of transistors T9 and T10 to the collectors of transistors T6 and T5, respectively. As is evident from FIGURE 6, if transistors T1, T2, T3 and T4 were all simultaneously in an on state, two short circuits from ground to the negative terminal of the source would exist, one through transistors T1 and T4, and the other through T2 and T3. Accordingly if transistor T5 is turned on to energize drive transistors T1 and T3, the base of transistor T10 will be clamped through diode D2 so as to prevent turn on of transistor T10 to attempt opposite energization of the printed circuit motor armature at the same time.

Figure 7A:
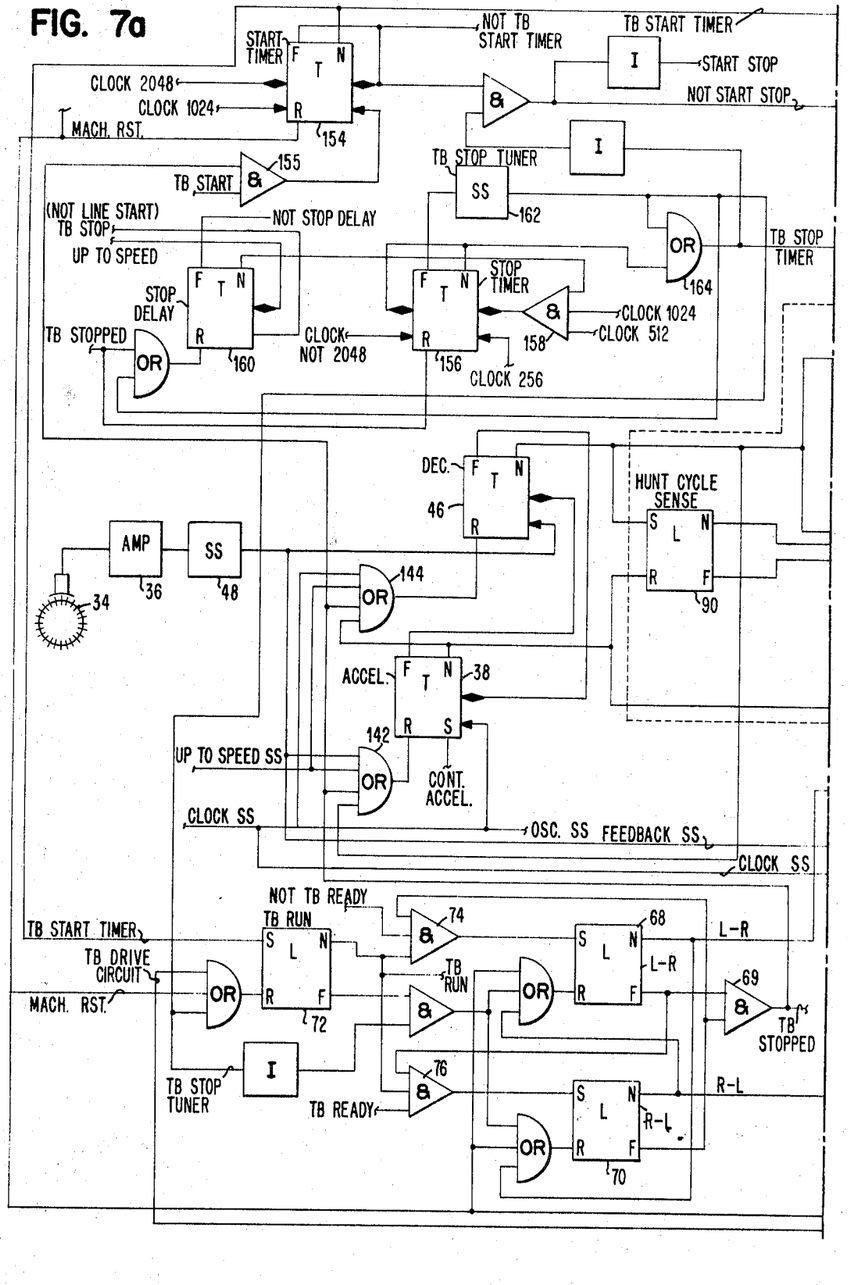
FIGURES 7a and 7b taken together provide a schematic circuit diagram of a modified type bar drive control according to the present invention.
Figure 7B:
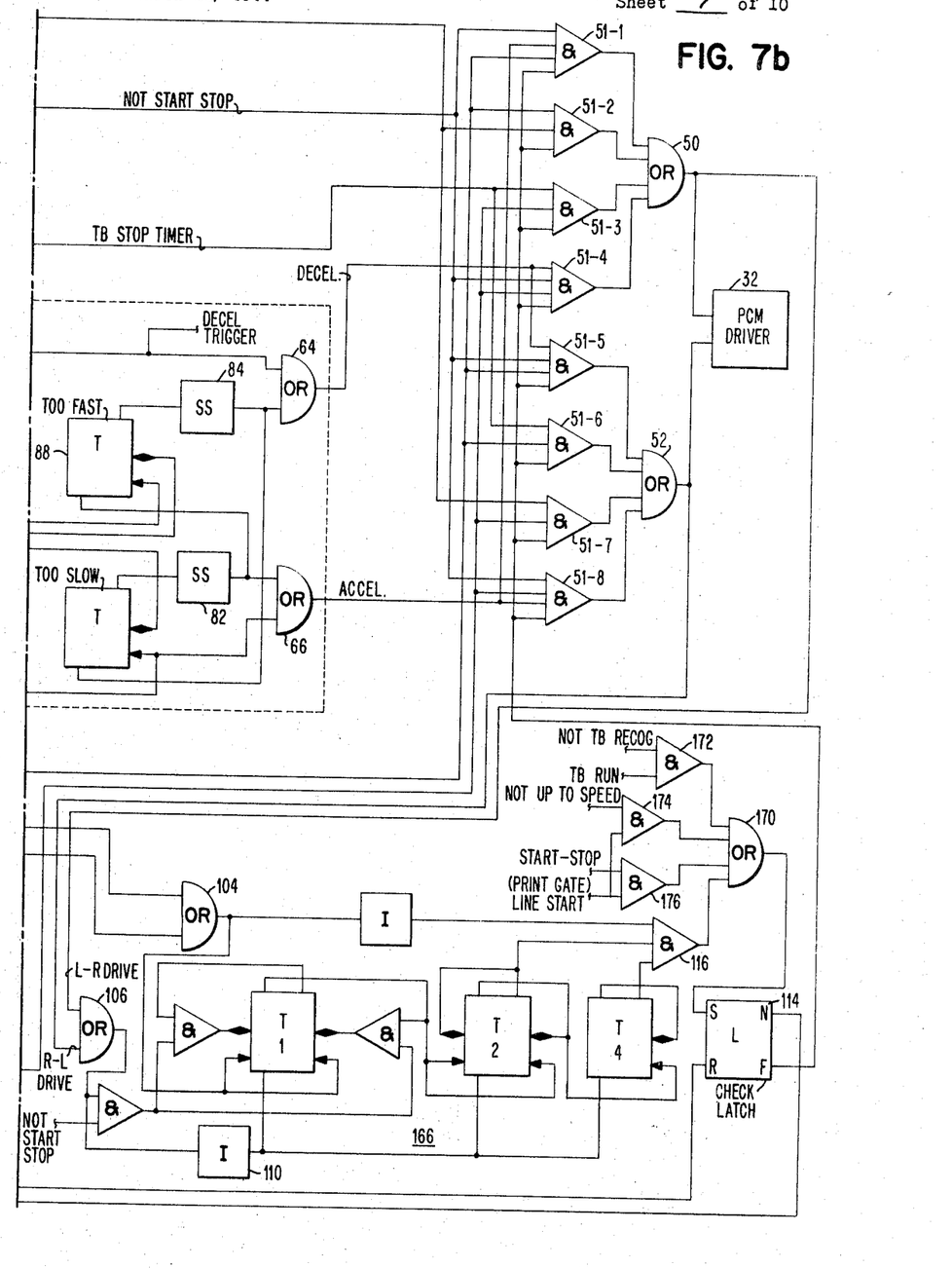
Figure 8:
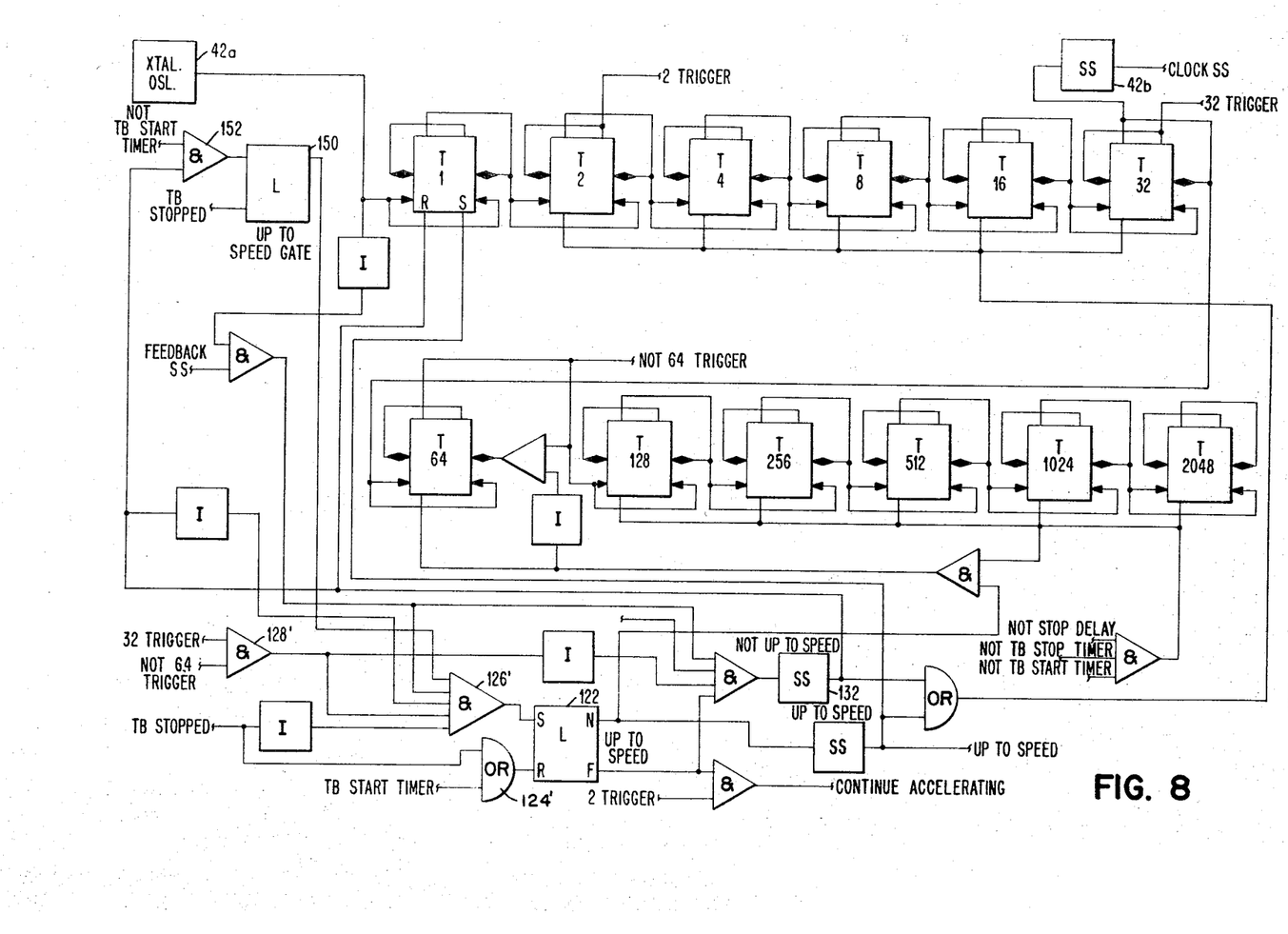
FIGURE 8 is a schematic circuit diagram of a modified clock and overshoot inhibit circuit used with the control circuit of FIGURES 7a and 7b.
Figure 8A:
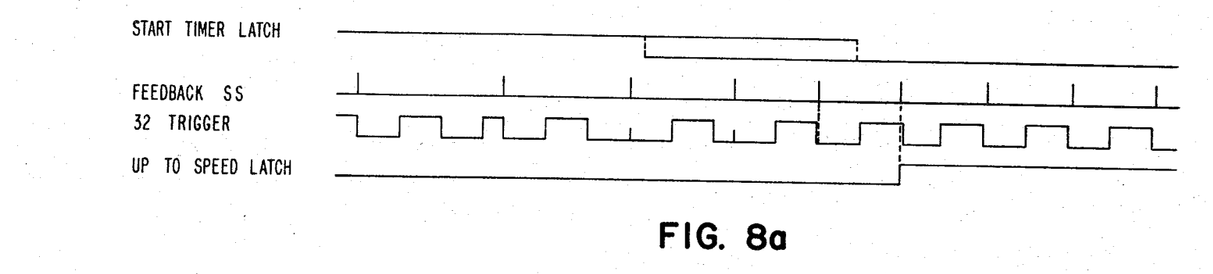
FIGURE 8a illustrates typical timing curves of the circuits of FIGURE 8.
Figure 9:
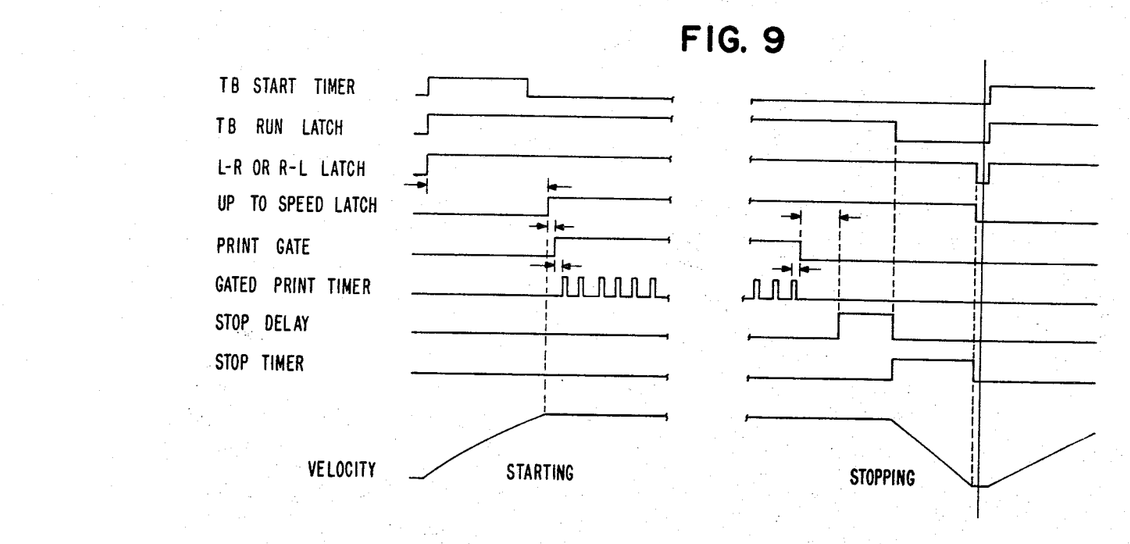
FIGURE 9 is a timing diagram illustrating operations during starting and stopping of the printed circuit motor.

Referring to FIGURE 8 it will be seen that in another embodiment of the present invention, the clock has been modified to provide a six-stage binary counter for providing clock pulses from oscillator 42a through the clock single shot 42b, so as to divide the clock cycle into 64 equal parts, thus permitting the clock output phase to be switched to 1/64 of a cycle of any phase desired by resetting the counter to the proper count. Reset of the clock is substantially identical to that described in connection with the operation of the clock in FIGURE 5, the Not Up-to-Speed single shot 122 being triggered through AND circuit 128' in response to the 32 trigger and Not 64 trigger outputs. Instead of utilizing the Start Timer and Stop Timer single shots 52 and 54 of FIGURE 4a, six additional stages have been added to the binary counter in order to provide timed outputs for effecting the functions of these single shots. Since the counter will be used to provide the Start Timer signal in the circuit of FIGURES 7a, 7b, and Up-to-Speed gate latch 150 is provided for furnishing an input to AND circuit 126 for setting the Up-to-Speed latch 122 for preventing setting of this latch before the counter is reset following the Start Timer signal. The latch 150 turns on the AND circuit 152, which gates Not TB Start Timer with the output of the Not Up-to-Speed single shot 132. Reset of latch 122 is through OR 124'.

Referring now to FIGURES 7a and 7b it will be seen that the gating circuits or AND circuits 51-1 through 51-8 for providing the L-R and R-L drive signals to the printed circuit motor drive circuit 32 are substantially the same as in FIGURES 4a and 4b and operation of the control circuits is substantially the same as described in connection therewith. Instead of using a single shot 52 to provide the Start Timer signal, a Start Timer trigger 154 is employed, which is turned on through AND 155 by TB Start and TB Stopped from AND 69, and is turned off at a count of 3072 by a gate signal from the counter 2048 trigger and a set signal from the counter 1024 trigger to give a start time of approximately 12 milliseconds. The Stop Timer single shot 54 is replaced by a Stop Timer trigger 156 which is turned on through AND circuit 158 which gates the on output of a Stop Delay trigger 160 with the clock signals 1024 and 512. The clock signal 256 is used as a set signal so that the Stop Timer turns on at a count of 1792 and is turned off by the clock signal Not 2048 (clock trigger 2048 off signal) so that it turns off at a count of 4096. An adjustable TB Stop Tuner single shot 162 connected to the off output of the Stop Timer extends the count for up to 2 milliseconds providing its output through OR circuit 164, so that the duration of deceleration provided by the Stop Timer and Stop Tuner may be adjusted to bring the type bar exactly to a halt.

The checking circuit 166 is also basically the same as the checking circuit 100 of FIGURE 4b, but has an additional stage, so as to provide for turning on the Type Bar Check latch 114 if the counter ever reaches a count of six. The counter is driven through OR circuit 104 in response to clock and feedback pulses, and is set through inverter 110 in response to the absence of either L-R or R-L signals from OR circuit 106. OR circuit 170 is provided for setting the check latch 114 in response to a Not TB Recognition Signal, which is derived from, and occurs when all of the type bar photocells are exposed; at a time when the TB Run signal is on, through AND circuit 172; when the type bar is not up-to-speed and Line Start or Print Gate is on, through AND circuit 174; or when the Start-Stop signal occurs with Line Start through AND circuit 176.

Figure 10:
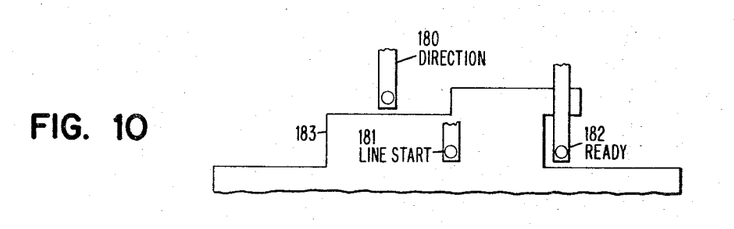
FIGURE 10 is a schematic representation of an arrangement of a type bar flag and solar cells used for producing control signals used in the circuits of FIGURES 7a, 7b and 8.

Referring to FIGURE 10 there is a schematic representation of an arrangement of solar cells 180, 181 and 182 which are used in connection with a flag having stepped portions 183 and 184 for producing the Direction, Line Start, and Ready signals used in the circuitry of FIGURES 7a and 7b.

While the invention has been particularly shown and described with reference to preferred embodiments thereof, it will be understood by those skilled in the art that various changes in form and details may be made therein without departing from the spirit and scope of the invention.

What is claimed is:
1. A control circuit for a direct current motor comprising:
   a clock having an oscillator driving a multistage counter of bistable devices to produce clock pulses,
   a source of feedback pulses having a rate dependent on the motor speed,
   circuit means including a first bistable device having on and off states operative to connnect the motor to a source of electrical energy to develop forward torque in the motor in the on state,
   circuit means including a second bistable device having on and off states operative to connect the motor to a source of electrical energy to develop reverse torque in said motor in the on state,
   means connecting the speed dependent pulse source to said first bistable device to switch said first device to the off state,
   other means connecting the speed dependent pulse source to the multistage counter selectively operable to reset the bistable devices of said counter to different values,
   means connecting the counter to said second bistable device operative to switch said second device to the off state,
   circuit means interconnecting the first and second bistable devices and respectively connecting the first and second bistable devices to the counter and to the source of feedback pulses operative to switch the first and second bistable devices to the on state.

2. A control system as defined in claim 1 characterized by:
   means including a single shot connected to provide a predetermined timed connection of the motor to the source to produce a torque in one direction to change the speed of the motor,
   and means connecting said first bistable device and said single shot for rendering said first bistable device ineffective during said predetermined timed connection of the motor by said single shot.

3. A control system as defined in claim 1 characterized by:
   a single shot connected to provide a predetermined timed connection of the motor to develop a torque in the forward direction substantially greater than the minimum duration provided by said first bistable device,
   a hunt cycle sense latch connected to the first and second devices to be switched on and off with switching of said devices,
   a trigger connected to the single shot and connected to be controlled by both the first bistable device and the hunt cycle sense latch to turn the single shot on only with a second consecutive switching on of said first bistable device and connect the motor to develop forward torque for a time greater than the minimum duration of the forward torque provided by the first bistable device.

4. A control system as defined in claim 1 characterized by:
   timer means for producing a start timer signal of predetermined duration after receipt of a start signal,
   an additional bistable device connected to reset the counter to a one count,
   and means including an AND connecting the additional bistable device to the source of feedback pulses, the counter and the timer means to effect operation thereof in response to a feedback pulse occurring during a predetermined count of the counter, but after the termination of the timer signal.

5. A control system as defined in claim 1 characterized by:
   an additional bistable device connected to reset the counter to a one count,
   another bistable device connected to be turned off by the counter at a predetermined count to provide a signal of predetermined duration following a start signal,
   and circuit means connecting said additional bistable device to said another bistable device, said counter and said source of feedback pulses to effect operation of said additional bistable device in response to a feedback pulse occurring during a predetermined count after the another bistable device is turned off.

6. A control system as defined in claim 1 characterized by:

the other means connecting the speed dependent pulse source to the multistage counter is so connected as to reset the counter to zero, and said other means is so connected to the another bistable device as to be rendered ineffective for a predetermined time after a start signal is received.

7. A control system as defined in claim 4 characterized by:

an up-to-speed bistable device which has on and off states and is connected to the source of feedback pulses and the counter to be turned on by a speed dependent pulse occurring while a predetermined stage of the counter is on, said up-to-speed bistable device being connected to said another bistable device so as to be held reset by said another bistable device providing the signal of predetermined duration following a start signal, and being connected to said multistage counter to reset it to a one count.

References Cited

UNITED STATES PATENTS

| | | | |
|---|---|---|---|
| 3,154,730 | 10/1964 | Houldin | 318—318 |
| 3,192,461 | 6/1965 | Hohne | 318—318 |
| 3,281,635 | 10/1966 | Hohne | 318—318 |
| 3,348,107 | 10/1967 | Hamby | 318—318 |

ORIS L. RADER, *Primary Examiner.*

K. L. CROSSON, *Assistant Examiner.*

U. S. Cl. X.R.

318—265, 282, 318